United States Patent [19]

Shinonaga et al.

[11] Patent Number: 5,273,789
[45] Date of Patent: Dec. 28, 1993

[54] METHOD OF TREATING SURFACE OF MOLDED ARTICLE OF POLYPROPYLENE RESIN AND METHOD OF COATING SAID MOLDED ARTICLE WITH PAINT

[75] Inventors: Hideo Shinonaga, Chiba; Satoru Sogabe, Sodegaura, both of Japan

[73] Assignee: Sumitomo Chemical Company, Limited, Osaka, Japan

[21] Appl. No.: 925,742

[22] Filed: Aug. 7, 1992

[30] Foreign Application Priority Data

Aug. 12, 1991 [JP] Japan ................... 3-201934

[51] Int. Cl.$^5$ ............................................. B05D 3/06
[52] U.S. Cl. ...................... 427/558; 264/22; 264/25; 427/322; 427/393.5
[58] Field of Search ............... 264/22, 25; 427/322, 427/558, 393.5; 425/174

[56] References Cited

U.S. PATENT DOCUMENTS 5,077,082 12/1991 Katoh et al. ............... 427/558
5,185,188 2/1993 Abe et al. ............... 427/322 X

FOREIGN PATENT DOCUMENTS 32731   1/1981 European Pat. Off. .
466930  1/1992 European Pat. Off. .
471078  2/1992 European Pat. Off. .
3831416 4/1989 Fed. Rep. of Germany .
11482   1/1991 World Int. Prop. O. .
11483   1/1991 World Int. Prop. O. .

*Primary Examiner*—Michael Lusignan

[57] ABSTRACT

The present invention provides a method which enables the surface of a molded article of a polypropylene resin to be modified to a surface suitable for coating, bonding, printing, etc. A molded article of a polypropylene resin comprising polypropylene, an ethylene-propylene copolymer rubber and an ethylene-acrylic acid or ethylene-methacrylic acid copolymer and optionally a filler is irradiated in the air with a light from a synthetic quartz low pressure mercury lamp having an output of 200 W for 60 sec with the distance between the surface of the molded article and the lamp being kept at about 10 cm.

18 Claims, No Drawings

METHOD OF TREATING SURFACE OF MOLDED ARTICLE OF POLYPROPYLENE RESIN AND METHOD OF COATING SAID MOLDED ARTICLE WITH PAINT

RELATED CO-PENDING APPLICATIONS

The following co-pending applications are related to the present invention:

U.S. Ser. No. 07/759,143, filed on Sep. 11, 1991, which is a continuation application of Ser. No. 07/445,938, filed on Dec. 7, 1989, now abandoned, which is a continuation-in-part application of Ser. No. 07/175,465 filed on Mar. 30, 1988, now abandoned.

BACKGROUND OF THE INVENTION

Field of the Invention

The present invention relates to a method of treating the surface of a molded article of a polypropylene resin formed by injection molding or extrusion molding and a method of coating the molded article with a paint. More particularly, the present invention is concerned with a method of treating the surface of a molded article of a polypropylene resin comprising polypropylene, an ethylene-propylene copolymer rubber, or an ethylene-acrylic acid or ethylene-methacrylic acid copolymer, and a coating method using the same.

Description of Related Art

It is difficult to successfully conduct coating, bonding, printing, etc. on a molded article of a polypropylene resin because the polypropylene resin is non-polar. For this reason, various proposals have been made for successfully conducting the coating etc. on the surface of the molded article.

For example, in order to further improve the compatibility of a molded article of a polypropylene resin molding (hereinafter often referred to as "molded article") with an adhesive or paint, a proposal has been made on the provision of an interlayer between the molded article and the adhesive or paint. A medium known as the so-called "primer" comprising a chlorinated polypropylene and toluene has been widely used as the interlayer.

Sand blasting, chromic acid mixture treatment, flame treatment, corona discharge treatment, plasma treatment, etc. have been proposed as a surface treatment method for modifying the surface of a molding to a surface suitable for coating etc.

However, in the conventional method wherein an interlayer is provided, the primer per se is expensive and it is necessary to newly add one step for forming the interlayer, so that the final cost of the product becomes high.

Further, none of the conventional surface treatment methods such as sand blasting, chromic acid mixture treatment, flame treatment, corona discharge treatment and plasma treatment provided no satisfactory results. Further, for example, the chromic acid mixture treatment has a problem that the waste solution should be made pollution-free.

The present invention has been made under these circumstances, and an object of the present invention is to solve the above-described problems and to provide a surface treatment method very useful for improving the coatability, adhesion and printability of the surface of a molded article of a polypropylene resin.

SUMMARY OF THE INVENTION

The present inventors have made extensive and intensive studies with a view to attaining the above-described object. As a result, they have found that the irradiation of the surface of a molded article of a polypropylene resin comprising polypropylene, an ethylene-propylene copolymer rubber, or an ethylene-acrylic or ethylene-methacrylic copolymer resin with ultraviolet rays having a dominant irradiation wavelength in a region of 300 nm or less enables the surface of the molded article of the polypropylene resin to be modified to a surface suitable for coating, bonding and printing.

Accordingly, the method of treating the surface of a molded article of a polypropylene resin according to the first invention comprises irradiating a molded article of a resin composition comprising (A) 10 to 90 parts by weight of polypropylene, (B) 5 to 50 parts by weight of an ethylene-propylene copolymer rubber and (C) 3 to 60 parts by weight of an ethylene-acrylic acid or ethylene-methacrylic acid copolymer resin (and optionally 40 parts by weight or less, based on 100 parts by weight of the composition comprising (A) the polypropylene resin, (B) the ethylene-propylene copolymer rubber and (C) the ethylene-acrylic acid or ethylene-methacrylic acid copolymer resin, of a filler) with ultraviolet rays having an irradiation wavelength in a region of 300 nm or less.

The method of coating a molded article of a polypropylene resin with a paint according to the second invention comprises coating the polypropylene resin molding after the practice of the first invention with a paint.

DESCRIPTION OF THE PREFERRED EMBODIMENTS

In practicing the first and second inventions, the molded article may be in any form. Specifically, these inventions may be applied to a molded articles in the form of a sheet, a film and a fiber, etc.

The constitution of the first and second inventions will now be described in detail

(A) Polypropylene

The term "polypropylene" used in the first and second inventions is intended to mean a crystalline polypropylene, and examples thereof include at least one resin selected from (a) a homopolypropylene, (b) a polypropylene-α-olefin random copolymer produced by copolymerizing propylene with, for example, an α-olefin such as ethylene; butene-1; 4-methyl-pentene-1; or hexene-1; ans (c) propylene-ethylene block copolymer (a) Homopolypropylene A homopolypropylene having a melt index of 10 to 100 g/10 min is favorable. When the melt index is smaller than 10 g/10 min, no injection molded article having an excellent appearance (in respect of flow mark and gloss) can be obtained On the other hand, when the melt index exceeds 100 g/10 min, the properties, particularly impact strength, of the molded article lower.

(b) Propylene-α-olefin random copolymer

A propylene-α-olefin random copolymer having an α-olefin content in the range of from 0.5 to 8% by weight is favorable. When the α-olefin content is higher than 8% by weight, the properties, particularly heat resistance, of the molded article lower. The α-olefin is particularly preferably ethylene.

The propylene-α-olefin random copolymer preferably has a melt index in the range of from 10 to 100 g/10 min The reason for this is the same as that in the case of the homopolypropylene.

(c) Propylene-ethylene block copolymer

It is preferred that the propylene-ethylene block copolymer have an ethylene content of 2 to 15% by weight, an ethylene content of 20 to 60% by weight in the propylene-ethylene copolymer portion and an intrinsic viscosity of 2 to 10 dl/g, preferably 3 to 8 dl/g, in the propylene-ethylene copolymer portion as measured in a tetralin solution at 135° C. When the ethylene content is outside the above-described range, the impact strength of the molded article lowers. When the intrinsic viscosity is smaller than 2 dl/g, the impact strength of the molded article lowers. On the other hand, when the intrinsic viscosity exceeds 10 dl/g, the fluidity of the resin composition during molding lowers and the appearance of the molded article deteriorates.

Further, it is preferred that the propylene-ethylene block copolymer have a melt index in the range of from 10 to 100 g/10 min. The reason for this is the same as that in the case of the homopolypropylene.

The homopolypropylene (a), propylene-α-olefin random copolymer (b) and propylene-ethylene block copolymer (c) each may be produced, for example, by a reaction in the presence of a catalyst usually called "Ziegler-Natta catalyst" comprising a combination of titanium trichloride with an alkyl aluminum compound.

In the first and second inventions, besides the polypropylene, a modified polypropylene or mixture of a modified polypropylene with polypropylene may be used as the polypropylene (A).

The term "modified polypropylene" is intended to mean a polypropylene modified by the grafting an unsaturated carboxylic acid or its anhydride in an amount in the range of from 0.05 to 20% by weight, preferably in the range of from 0.1 to 10% by weight, onto the above-described polypropylene.

Examples of the graft monomer in the modified polypropylene graft-modified with an unsaturated carboxylic acid or its anhydride include acrylic acid, methacrylic acid, maleic acid, itaconic acid, maleic anhydride and itaconic anhydride. Among them, maleic anhydride is particularly preferred.

The graft monomer may be grafted onto polypropylene by various known methods.

Examples of such methods include a method wherein polypropylene, a graft monomer and a radical initiator are melt-kneaded with each other within an extruder for grafting, a method which comprises dissolving polypropylene in an organic solvent, such as xylene, adding a radical generator to the solution in a nitrogen atmosphere, allowing a thermal reaction to proceed with stirring, cooling the reaction system after the completion of the reaction, washing and filtering the reaction mixture and drying the resultant solid to give a grafted polypropylene, a method wherein polypropylene is irradiated with ultraviolet rays or radioactive rays in the presence of a graft monomer, and a method wherein polypropylene is brought into contact with oxygen or ozone.

(B) Ethylene-Propylene Copolymer Rubber

The term "ethylene-propylene copolymer rubber" used in the first and second inventions is intended to mean an ethylene-propylene copolymer rubber having a propylene content of 10 to 70% by weight and a Mooney viscosity ($ML_{1+4}$, 100° C.) of 10 to 100. When the propylene content is outside the above-described range, the impact strength of the molded article lowers. When the Mooney viscosity is less than 10, the mechanical properties of the molded article deteriorate, while when the Mooney viscosity exceeds 100, the appearance of the molded article becomes poor due to a lowering in the fluidity of the resin composition during the molding. In the first and second inventions, the ethylene-propylene copolymer rubber includes an ethylene/propylene/non-conjugated diene copolymer rubber.

(C) Ethylene Copolymer Resin

In the first and second inventions, the term "ethylene-acrylic acid copolymer resin or ethylene-methacrylic acid copolymer resin (these resins are often collectively referred to as "ethylene copolymer resin") is intended to mean an ethylene-acrylic acid copolymer resin, an ethylene-acrylic ester copolymer resin, an ethylene-methacrylic acid copolymer resin or an ethylene-methacrylic ester copolymer resin.

The ethylene content of the ethylene copolymer resin is preferably in the range of from 50 to 95% by weight. When the ethylene content is less than 50% by weight, the heat resistance of the molded article deteriorates. On the other hand, when the ethylene content exceeds 95% by weight, since the co-monomer content becomes so low that the ultraviolet irradiation according to the present invention provides no improvement in the coatability, adhesion and printability of the molded article.

Examples of the acrylic ester include methyl acrylate, ethyl acrylate, i-propyl acrylate, t-butyl acrylate, glycidyl acrylate, dimethylaminomethyl acrylate, dimethylaminoethyl acrylate, dimethylamino-i-propyl acrylate, dimethylamino-t-butyl acrylate, diethylaminomethyl acrylate, diethylaminoethyl acrylate, diethylamino-i-propyl acrylate and diethylamino-t-butyl acrylate.

Examples of the methacrylic ester include methyl methacrylate, ethyl methacrylate, i-propyl methacrylate, t-butyl methacrylate, glycidyl methacrylate, dimethylaminomethyl methacrylate, dimethylaminoethyl methacrylate, dimethylamino-i-propyl methacrylate, dimethylamino-t-butyl methacrylate, diethylaminomethyl methacrylate, diethylaminoethyl methacrylate, diethylamino-i-propyl methacrylate and diethylamino-t-butyl methacrylate.

(D) Percentage Composition

The resin composition used in the molding according to the first and second inventions comprises (A) 10 to 90 parts by weight, preferably 10 to 60 parts by weight, of at least one polypropylene selected from (a) a homopolypropylene, (b) a propylene-α-olefin random copolymer and (c) a propylene-ethylene block copolymer, (B) 5 to 50 parts by weight, preferably 10 to 40 parts by weight, of an ethylene-propylene copolymer rubber and (C) 3 to 60 parts by weight, preferably 30 to 60 parts by weight, of an ethylene-acrylic acid or ethylene-methacrylic acid copolymer.

When the content of the ethylene-propylene copolymer rubber (B) is less than 5 parts by weight, the effect of improving the impact strength of the molded article is small. On the other hand, when the content exceeds 50 parts by weight, the heat resistance of the molded article lowers. When the content of the ethylene-acrylic acid or ethylene methacrylic acid resin (C) is less than 3 parts by weight, the ultraviolet irradiation according to the present invention provides no satisfactory effect of improving the coatability, adhesion, printability, etc. of the molded article. On the other hand, when the content exceeds 60 parts by weight, the heat resistance of the molded article lowers.

In the first and second inventions, when a filler comprising an inorganic filler and/or a glass fiber is incorporated in the resin composition, the proportion of the filler is preferably up to 40 parts by weight based on 100 parts by weight of the composition comprising (A) polypropylene, (B) an ethylene-propylene copolymer rubber and (C) a copolymer resin. This is because when molding is conducted through the use of a resin composition containing an inorganic filler and/or a glass fiber in an amount exceeding 40 parts by weight, the impact resistance of the resultant molded article remarkably lowers. When molding is conucted through the use of a resin composition free from any of the inorganic filler and the glass fiber, although the heat resistance, rigidity and dimensional stability of the molded article are poor, the molded article has an improved impact strength. When the inorganic filler is used in combination with the glass fiber, the proportions of the inorganic filler and the glass fiber are preferably 20 to 80 % by weight and 80 to 20% by weight, respectively.

In practicing the first and second inventions, if necessary, the resin composition used in the molding may contain various additives such as pigments, ultraviolet absorbers, heat stabilizers, flame retardants, antistatic agents, weathering agents, forming agents, antioxidants and plasticizers. Further, in practicing the first and second inventions, when a molded article of a polypropylene resin is produced, if necessary, the resin composition used in the molding may contain an ethylene-propylene-non-conjugated copolymer rubber, a propylene-butene rubber, an isoprene-butylene rubber, polyisoprene. polybutadiene, and styrene block copolymers, for example, rubber-like substances such as a styrene-butadiene rubber, a styrene-butadiene-styrene block copolymer, a partially hydrogenated styrene-butadiene block copolymer, a styrene-isoprene block copolymer and a partially hydrogenated styrene-isoprene block copolymer in such an amount as will not spoil various properties of the molded article of the resin.

(E) Blending Method and Molding Method

There is no particular limitation on the process for producing the polypropylene resin composition used in the molding in the first and second invention, and use may be made of the conventional process.

It is also effective to use a process which comprises melt-mixing the polypropylene (A) with the ethylene-propylene copolymer rubber (B) and the copolymer resin (C) and evaporating the solvent or precipitating the composition in a non-solvent. In fact, however, a process wherein the components are kneaded with each other in a molten state is preferred from the standpoint of industry. A Bunbary mixer, an extruder, a roll, various kneaders, etc. commonly used in the art may be used for the melt kneading.

In the kneading, it is preferred that individual resin components be previously homogeneously blended in the form of a pellet in an apparatus such as a tumbler or a Henschel mixer. If necessary, however, the blending may be omitted, and the resin components may be separately fed at a constant feed rate to a kneading device.

The kneaded resin composition can be molded by injection molding, extrusion molding and various other molding methods. Further, in the present invention, it is also possible to use a method wherein, without conducting the step of kneading, the components are dry-blended with each other at the time of the injection molding or extrusion molding and directly blended during melt processing to obtain a molded article.

(F) Surface Treatment Method and Coating Method

In the first and second inventions, the surface of a molded article formed by molding the above-described polypropylene resin composition is irradiated with ultraviolet rays.

The light applied to the surface of the molded article is preferably a light having a wavelength of 300 nm or less, particularly preferably ultraviolet rays having wavelengths of 254 nm and 185 nm as a dominant active wavelength. The stronger the intensity of the light, the better the results. The ultraviolet irradiation time is preferably about 20 sec to 10 min, more preferably 30 sec to 5 min. This is because when the ultraviolet irradiation time is shorter than 20 sec, the effect of improving the coatability, adhesion, printability, etc. of the molded article of the composition is unsatisfactory, while when the ultraviolet irradiation time is longer than 10 min, not only the profitability is poor but also the surface of the molded article of the resin composition unfavorably begins to deteriorate.

A synthetic quartz low pressure mercury lamp is preferably used as a lamp for applying the ultraviolet rays to the molded article. This is because in this type if mercury lamp, the intensity of a light having a wavelength of 254 nm and 185 nm is higher than that of a natural quartz low pressure mercury lamp.

In practicing the first and second inventions, it is preferred to degrease the molded article prior to the irradiation of the surface of the molded article of a polypropylene resin with ultraviolet rays. Water or an aqueous solution of an alkali and alcohols such as ethanol and isopropyl alcohol may be used as a solvent for degreasing the surface of the molded article of a polypropylene resin.

Examples of the method of bringing the degreasing solution into contact with the surface of the molded article of a polypropylene resin include coating, wiping and spraying.

In the second invention, the molded article irradiated with ultraviolet rays us coated with a paint. Preferred examples of the paint used in practicing the second invention include epoxy, polyester, acrylic and urethane paints.

In particular, since the urethane paint is flexible, it is extensively used in parts of automobiles and motorbike. Examples of the urethane paint include paints having a urethane structure, such as acrylic urethanes, polyester urethane and other modified urethane.

EXAMPLES

The present invention will now be described in more detail with reference to the following EXAMPLES. However, materials and numerical conditions such as mixing ratio of the materials, treatment temperature and treatment time used in the following EXAMPLES are merely a preferred embodiment falling within the scope of claims of the present invention. Therefore, it should be understood that the present invention is not limited to these materials and numerical conditions only.

Method of Evaluating Coatability (Initial Adhesion)

The surface treatment effect of the molded articles subjected to the surface treatment method in the following EXAMPLES and COMPARATIVE EXAMPLES was evaluated as follows. The surface of the molded article subjected to the surface treatment was coated with a paint, and 100 cross-cuts each having a side length of 2 mm (10 cross-cuts×10 cross-cuts) were cut by means of a razor on the coating of the coated molded article. A cellophane tape (trade name of a tape manufactured by Nichiban Co., Ltd.) having a width of 24 mm was contact-bonded onto the coating by means of a finger. Then, the end face of the tape was grasped, and the tape was peeled off at a breath. The number of cross-cuts remaining unpeeled (percentage remaining cross-cuts (%)) was counted to evaluate the coatability.

EXAMPLE 1

30 parts by weight of a propylene-ethylene random block copolymer having a melt index of 30 g/10 min and an ethylene content of 3% by weight (hereinafter refereed to as "PP-1"), 30 parts by weight of an ethylene-propylene copolymer rubber having a propylene content of 28% by weight a Mooney viscosity ($ML_{1+4}$, 100° C.) of 45 (hereinafter referred to as "EPR-1") and 40 parts by weight of an ethylene-methyl methacrylate copolymer (methyl methacrylate content: 15% by weight; hereinafter referred to as "EMMA-1") were blended with each other, and preliminarily blended with each other in a tumbler for 20 min. The blend was pelletized by melt-kneading at a temperature of 250° C. through the use of a TEX 44SS-30BW-2V type twin-screw extruder manufactured by The Japan Steel Works, Ltd. The resultant pellet was molded at 220° C. by means of an injection molding machine (model FS-75N) manufactured by Nissei Plastic Industrial Co., Ltd. into a molded article in a sheet form.

The resultant molded article was put in front of an ultraviolet irradiation device equipped with a synthetic quartz low pressure mercury lamp. The distance between the lamp and the surface of the molded article was kept at about 10 cm, and the molded article was irradiated with ultraviolet rays (UV) having a dominant active wavelength of 254 nm and 185 nm in an air atmosphere for 60 sec to conduct a surface treatment. The lamp (manufactured by Sen Lights Corp.) had an output of 200 W. The irradiation dose of light having a wavelength of 254 nm from the lamp was 840 mJ/cm$^2$.

The surface of the molded article subjected to an ultraviolet irradiation treatment was spray-coated with an acrylic urethane paint (RECRACK ®#440S manufacture by Fujikura Kasei Corp.), and the coating was baked and dried at 80° C. for 30 min. Thereafter, the initial adhesion of the coating of the coated molded article was measured by the above-described coatability evaluation method. The results are given in Table 1.

COMPARATIVE EXAMPLE 1

The initial adhesion of the coating of the coated molded article was measured in the same manner as that of EXAMPLE 1, except that no ultraviolet irradiation was conducted. The results are given in Table 1.

COMPARATIVE EXAMPLE 2

The initial adhesion of the coating of the coated molded article was measured in the same manner as that of EXAMPLE 1, except that the molding was conducted through the use of a resin composition comprising 70 parts by weight of PP-1 and 30 parts by weight of ERP-1. The results are given in Table 1.

EXAMPLE 2

The initial adhesion of the coating of the coated molded article was measured in the same manner as that of EXAMPLE 1, except that the molding was conducted through the use of a resin composition comprising a mixture of 28 parts by weight of PP-1 with 44 parts by weight of EMMA-1 and 28 parts by weight of an ethylene-propylene copolymer rubber having a propylene content of 22% by weight and a Mooney viscosity ($ML_{1+4}$, 100° C.) of 35 (hereinafter referred to as "EPR-2"), added to the mixture, 10 parts by weight, based on 100 parts by weight of the mixture, of calcium carbonate (ESCALON ®#200 manufactured by Hayashi Kasei Corp.; hereinafter referred to as "filler"). The results are given in Table 2.

COMPARATIVE EXAMPLE 3

The initial adhesion of the coating of the coated molded article was measured in the same manner as that of EXAMPLE 2, except that no ultraviolet irradiation was conducted. The results are given in Table 2.

As is apparent from EXAMPLE 2 with COMPARATIVE EXAMPLE 3, the irradiation of ultraviolet rays having a wavelength of 300 nm or less is useful for improving the coatability of the molded article also when the molded article contains a filler.

EXAMPLE 3

The initial adhesion of the coating of the coated molded article was measured in the same manner as that of EXAMPLE 1, except that the molding was conducted through the use of a resin composition comprising a mixture of 45 parts by weight of PP-1 with 25 parts by weight of EPR-2 used in Example 2 and 30 parts by weight of EMMA-1. The results are given in Table 3.

COMPARATIVE EXAMPLE 4

The initial adhesion of the coating of the coated molded article was measured in the same manner as that of EXAMPLE 3, except that no ultraviolet irradiation was conducted. The results are given in Table 3.

TABLE 1

| | Mixing ratio of components of resin composition (parts by weight) | | | Ultraviolet irradiation | Paint used in coating | Initial adhesion (%) |
| --- | --- | --- | --- | --- | --- | --- |
| | PP-1 | EPR-1 | EMMA-1 | | | |
| EX. 1 | 30 | 30 | 40 | irradiated | RECRAC ® #440S | 95 |
| Comp. Ex. 1 | 30 | 30 | 40 | not irradiated | RECRAC ® #440S | 0 |
| Comp. Ex. 2 | 70 | 30 | 0 | irradiated | RECRAC ® #440S | 30 |

TABLE 2

| | Mixing ratio of components of resin composition (parts by weight) | | | | Ultraviolet irradiation | Paint used in coating | Initial adhesion (%) |
| --- | --- | --- | --- | --- | --- | --- | --- |
| | PP-1 | EPR-1 | EMMA-1 | filler | | | |
| EX. 2 | 28 | 28 | 44 | 10 | irradi- | REC- | 99 |

TABLE 2-continued

| | Mixing ratio of components of resin composition (parts by weight) | | | Ultra-violet irradi-ation | Paint used in coating | Initial adhesion (%) |
|---|---|---|---|---|---|---|
| | PP-1 | EPR-1 | EMMA-1 | filler | | |
| | | | | | ated | RAC ® #440S |
| Comp. Ex. 3 | 28 | 28 | 44 | 10 | not irradi-ated | REC-RAC ® #440S | 0 |

TABLE 3

| | Mixing ratio of components of resin composition (parts by weight) | | | Ultra-violet irradi-ation | Paint used in coating | Initial adhesion (%) |
|---|---|---|---|---|---|---|
| | PP-1 | EPR-2 | EMMA-1 | | | |
| EX. 3 | 45 | 25 | 30 | irradi-ated | RECRAC ® #440S | 96 |
| Comp. Ex. 4 | 45 | 25 | 30 | not irradi-ated | RECRAC ® #440S | 0 |

As is apparent also from the above-described description, according to the method for treating the surface of a molded article of the first invention, the surface of a molded article of the polypropylene resin comprising polypropylene, an ethylene-propylene copolymer rubber or an ethylene-acrylic acid or ethylene-methacrylic acid copolymer (and optionally containing a filler) can be modified to a surface suitable for coating, bonding, printing, etc. Further, the method of the first invention does not advantageously produce a waste solution and therefore is a nonpolluting method as compared with, for example, chromic acid mixture treatment method.

According to the coating method of the second invention, a desired coating can be easily conducted on a molded article of a polypropylene resin comprising polypropylene, an ethylene-propylene copolymer rubber or an ethylene-acrylic acid or ethylene-methacrylic acid copolymer (and optionally containing a filler). Therefore, the present inventions can contribute to an improvement in the value of the molded article and an expansion of the applications of the molded article.

What is claimed is:

1. A method of treating the surface of a molded article of a polypropylene resin, comprising a step of irradiating a molded article of a resin composition with ultraviolet rays having an irradiation wavelength in a region of 300 nm or less, said resin composition comprising (A) 10 to 90 parts by weight of at least one polypropylene selected from (a) a homopolypropylene having a melt index of 10 to 100 g/10 min, (b) a propylene-α-olefin random copolymer having a content of an α-olefin having 1 to 6 carbon atoms (exclusive of 3 carbon atoms) in the range of from 0.5 to 8% by weight and a melt index of 10 to 100 g/10 min, (c) a propylene-ethylene block copolymer having an ethylene content of 2 to 15% by weight and a melt index of 10 to 100 g/10 min, the propylene-ethylene copolymer portion having an ethylene content of 20 to 60% by weight and an intrinsic viscosity of 2 to 10 dl/g as measured in a tetralin solution at 135° C., and (d) a modified polypropylene including polypropylene modified by grafting an unsaturated carboxylic acid or its anhydride in an amount in the range of from 0.05 to 20% by weight onto the polypropylene;

(B) 5 to 50 parts by weight of an ethylene-propylene copolymer rubber having a propylene content of 10 to 70% by weight and a Mooney viscosity ($ML_{1+4}100°$ C.) of 10 to 100, (C) 3 to 60 parts by weight of an ethylene-acrylic acid copolymer resin or ethylene-methacrylic acid copolymer resin having an ethylene content of 50 to 95% by weight, and 0 to 40 parts by weight, based on 100 parts by weight of the composition comprising (A) propylene, (B) the ethylene-propylene copolymer rubber and (C) the copolymer resin, of a filler comprising one of or both of an inorganic filler and a glass fiber.

2. A method of treating the surface of a molded article of a polypropylene resin according to claim 1, wherein said resin composition comprises (A) 10 to 60 parts by weight of the polypropylene, (B) 10 to 40 parts by weight of the ethylene-propylene copolymer rubber, (C) 30 to 60 parts by weight of the copolymer resin and 0 to 40 parts by weight, based on 100 parts by weight of the composition comprising (A) the polypropylene, (B) the ethylene-propylene copolymer rubber and (C) the copolymer resin, of the filler.

3. The method according to claim 1, wherein said modified polypropylene includes polypropylene modified by grafting an unsaturated carboxylic acid or its anhydride in an amount in the range of from 0.1 to 10% by weight onto the polypropylene.

4. The method according to claim 3, wherein said unsaturated carboxylic acid or its anhydride is selected from the group consisting of acrylic acid, methacrylic acid, maleic acid, itaconic acid, maleic anhydride, and itaconic anhydride.

5. The method according to claim 1, wherein said ethylene-acrylic acid copolymer resin or ethylene-methacrylic acid copolymer resin is selected from the group consisting of ethylene-acrylic acid copolymer resin, ethylene-acrylic ester copolymer resin, ethylene-methacrylic acid copolymer resin, and ethylene-methacrylic ester copolymer resin.

6. The method according to claim 5, wherein said acrylic ester is selected from the group consisting of methyl acrylate, ethyl acrylate, i-propyl acrylate, t-butyl acrylate, glycidyl acrylate, dimethylaminomethyl acrylate, dimethylaminoethyl acrylate, dimethylamino-i-propyl acrylate, dimethylamino-t-butyl acrylate, diethylaminomethyl acrylate, diethylamino ethyl acrylate, diethylamino-i-propyl acrylate, and diethylamino-t-butyl acrylate and said methacrylic ester is selected from the group consisting of methyl methacrylate, ethyl methacrylate, i-propyl methacrylate, t-butyl methacrylate, glycidyl methacrylate, dimethylaminomethyl methacrylate, dimethylaminoethyl methacrylate, dimethylamino-i-propyl methacrylate, dimethylamino-t-butyl methacrylate, diethylaminomethyl methacrylate, diethylaminoethyl methacrylate, diethylamino-i-propyl methacrylate, and diethylamino-t-butyl methacrylate.

7. The method according to claim 1, wherein said molded article is degreased prior to the irradiation of the surface of the molded article with ultraviolet rays.

8. The method according to claim 1, wherein said molded article is degreased using a solvent selected from the group consisting of water, an aqueous solution of an alkali, and alcohols.

9. A method of coating a molded article of a polypropylene resin, comprising steps of irradiating a molded article of a resin composition with ultraviolet rays having an irradiation wavelength in a region of 300 nm or less said resin composition comprising
   (A) 10 to 90 parts by weight of at least one polypropylene selected from (a) a homopolypropylene having a melt index of 10 to 100 g/10 min, (b) a propylene-α-olefin random copolymer having a content of an α-olefin having 1 to 6 carbon atoms (exclusive of 3 carbon atoms) in the range of from 0.5 to 8% by weight and a melt index of 10 to 100 g/10 min, (c) a propylene-ethylene block copolymer having an ethylene content of 2 to 15% by weight and a melt index of 10 to 100 g/10 min, the propylene-ethylene copolymer portion having an ethylene content of 20 to 60% by weight and an intrinsic viscosity of 2 to 10 dl/g as measured in a tetralin solution at 135 C., and (d) a modified polypropylene including polypropylene modified by grafting an unsaturated carboxylic acid or its anhydride in an amount in the range of from 0.05 to 20% by weight onto the polypropylene;
   (B) 5 to 50 parts by weight of an ethylene-propylene copolymer rubber having a propylene content of 10 to 70% by weight and a Mooney viscosity ($ML_{1+4}$, 100 C.) of 10 to 100,
   (C) 3 to 60 parts by weight of an ethylene-acrylic acid copolymer resin or ethylene-methacrylic acid copolymer resin having an ethylene content of 50 to 95% by weight, and
   0 to 40 parts by weight, based on 100 parts by weight of the composition comprising (A) propylene, (B) the ethylene-propylene copolymer rubber and (C) the copolymer resin, of a filler comprising one of or both of an inorganic filler and a glass fiber; and coating the irradiated molded article with a paint.

10. A method of coating a molded article of a polypropylene resin according to claim 9, wherein said resin composition comprises (A) 10 to 60 parts by weight of the polypropylene, (B) 10 to 40 parts by weight of the ethylene-propylene copolymer rubber, (C) 30 to 60 parts by weight of the copolymer resin and 0 to 40 parts by weight, based on 100 parts by weight of the composition comprising (A) the polypropylene, (B) the ethylene-propylene copolymer rubber and (C) the copolymer resin, of the filler.

11. The method according to claim 9, wherein said molded article is coated with a paint prior to irradiation with ultraviolet rays.

12. The method according to claim 9, wherein said paint is selected from the group consisting of epoxy, polyester, acrylic, and urethane paints.

13. The method according to claim 9, wherein said modified polypropylene includes polypropylene modified by grafting an unsaturated carboxylic acid or its anhydride in an amount in the range of from 0.1 to 10% by weight onto the polypropylene.

14. The method according to claim 13, wherein said unsaturated carboxylic acid or its anhydride is selected from the group consisting of acrylic acid, methacrylic acid, maleic acid, itaconic acid, maleic anhydride, and itaconic anhydride.

15. The method according to claim 9, wherein said ethylene-acrylic acid copolymer resin or ethylene-methacrylic acid copolymer resin is selected from the group consisting of ethylene-acrylic acid copolymer resin, ethylene-acrylic ester copolymer resin, ethylene-methacrylic acid copolymer resin, and ethylene-methacrylic ester copolymer resin.

16. The method according to claim 15, wherein said acrylic ester is selected from the group consisting of methyl acrylate, ethyl acrylate, i-propyl acrylate, t-butyl acrylate, glycidyl acrylate, dimethylaminomethyl acrylate, dimethylaminoethyl acrylate, dimethylamino-i-propyl acrylate, dimethylamino-t-butyl acrylate, diethylaminomethyl acrylate, diethylamino ethyl acrylate, diethylamino-i-propyl acrylate, and diethylamino-t-butyl acrylate and said methacrylic ester is selected from the group consisting of methyl methacrylate, ethyl methacrylate, i-propyl methacrylate, t-butyl methacrylate, glycidyl methacrylate, dimethylaminomethyl methacrylate, dimethylaminoethyl methacrylate, dimethylamino-i-propyl methacrylate, dimethylamino-t-butyl methacrylate, diethylaminomethyl methacrylate, diethylaminoethyl methacrylate, diethylamino-i-propyl methacrylate, and diethylamino-t-butyl methacrylate.

17. The method according to claim 9, wherein said molded article is degreased prior to the irradiation of the surface of the molded article with ultraviolet rays.

18. The method according to claim 9, wherein said molded article is degreased using a solvent selected from the group consisting of water, an aqueous solution of an alkali, and alcohols.

* * * * *